Oct. 16, 1962 W. P. AYRES ET AL 3,059,108

FREQUENCY CHANGER

Filed Dec. 28, 1956 2 Sheets-Sheet 1

INVENTOR.
WESLEY P. AYRES
JACK L. MELCHOR
BY PERRY H. VARTANIAN, JR.
Theodore Jay Jr.
ATTORNEY INVENTOR.
WESLEY P. AYRES
JACK L. MELCHOR
PERRY H. VARTANIAN, JR.
BY Theodore [signature]
ATTORNEY United States Patent Office 3,059,108
Patented Oct. 16, 1962

3,059,108

FREQUENCY CHANGER

Wesley P. Ayres, Los Altos, Jack L. Melchor, Mountain View, and Perry H. Vartanian, Jr., Menlo Park, Calif., assignors, by mesne assignments, to Sylvania Electric Products Inc., Wilmington, Del., a corporation of Delaware Filed Dec. 28, 1956, Ser. No. 631,135
22 Claims. (Cl. 325—445)

Our invention relates to frequency changers.

The microwave art has need for a device which can efficiently derive, from an incoming microwave signal of fixed frequency and relatively high power, an output microwave signal at a frequency which is an integral multiple of this fixed frequency, and further which can mix efficiently first and second incoming microwave signals of relatively high power and different fixed frequencies to produce a third microwave signal at a frequency differing from both fixed frequencies and equal to a selected one of the frequencies produced during mixing. We have invented such a device which we term a frequency changer.

Accordingly, it is an object of our invention to efficiently derive from an incoming microwave signal of fixed frequency and relatively high power, an output microwave signal at a frequency which is an integral multiple of this fixed frequency.

Another object is to efficiently mix together first and second incoming microwave signals of relatively high power and different fixed frequencies to produce a third microwave signal at a frequency differing from both fixed frequencies and equal to a selected one of the frequencies produced during mixing.

Still another object is to provide a new and improved frequency changer of the character indicated.

These and other objects of our invention will either be explained or will become apparent hereinafter.

In accordance with the principles of our invention, we employ a magnetic semiconductor or gyromagnetic element, as for example a ferrite, which supports a time-invariant (i.e. constant direct current) internal magnetic field. The field can be produced by external means or, alternatively, the semiconductor can be a permanent magnet. When a first electromagnetic wave of fixed frequency having its magnetic field component at right angles to the internal field is supplied to the semiconductor, a second electromagnetic wave of different fixed frequency is induced in the semiconductor, the magnetic field component of the second wave being parallel to the internal field. The magnetization of the second wave normal to that of the first wave and in a direction parallel to the internal field is proportional at low power levels to the second power of the magnetic field of the first wave. The frequency of the second wave is equal to an integral multiple of the frequency of the first wave.

Alternatively, first and second electromagnetic waves of different fixed frequency can be supplied to the semiconductor. Thse waves can be propagated at any direction relative to each other as long as the magnetic field components of both the first and second waves are perpendicular to the internal field of the semiconductor. Under these conditions, a third electromagnetic wave of different fixed frequency is induced in the semiconductor, the magnetic field component of the third wave being parallel to the internal field.

When first and second waves are supplied to the ferrite a mixing action ensues, and the frequency of the third wave differs from the frequency of each of the first and second waves and is equal to a selected one of the frequencies produced during mixing as, for example, the sum or difference of the frequencies of the first and second waves.

Illustrative embodiments of our invention will now be described in detail with reference to the accompanying drawings, wherein FIG. 1 shows a first embodiment of our invention;

Figure 1:
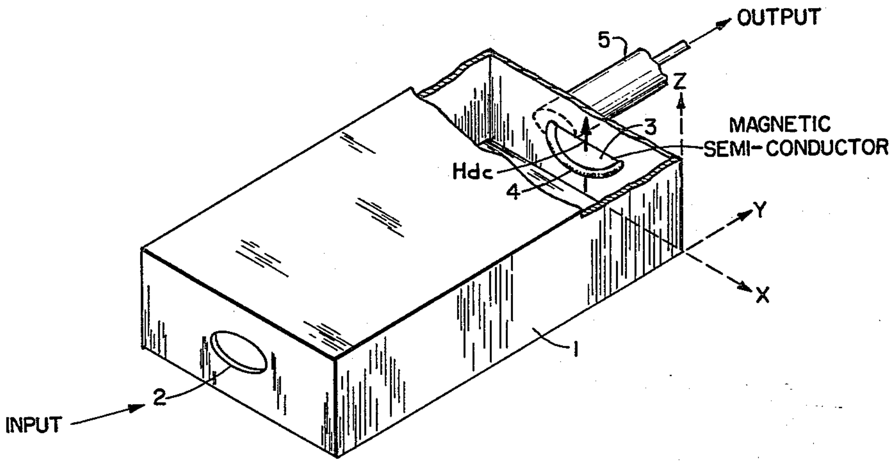

Referring now to FIG. 1, a ferrite element 3 shaped in the form of a disc or sphere is placed inside a cavity 1 which is coupled to a wave guide (not shown) by means of an iris 2. A coupling loop 4 surrounds the ferrite and is brought through the end wall of the cavity into a coaxial output line 5.

The element 3 supports a time invariant internal magnetic field (H*dc*) having the direction indicated. A first electromagnetic wave having a fixed frequency equal to the resonant frequency of the cavity feeds power through the iris into the cavity and establishes a region of high radio frequency energy within the cavity about element 3, the magnetic field component of the first wave being normal or perpendicular to the internal field. As a result, a second electromagnetic wave of different fixed frequency is induced in element 3 and appears on output coaxial line 5. The magnetic field component of the second wave is parallel to the internal field of element 3. The second wave is actually composed of $n$ different frequencies, each of which is equal to a different integral multiple of the frequency of the first wave. However, the power output of the second wave is predominantly carried by the frequency component of the second wave which is equal to twice the frequency of the first wave. For most purposes the higher frequencies carried by the second wave can be neglected and the device of FIG. 1 acts as a frequency doubler. However, these higher frequencies can be extracted from the ferrite if the coaxial line or other connection is tuned to the frequency desired.

Figure 3:
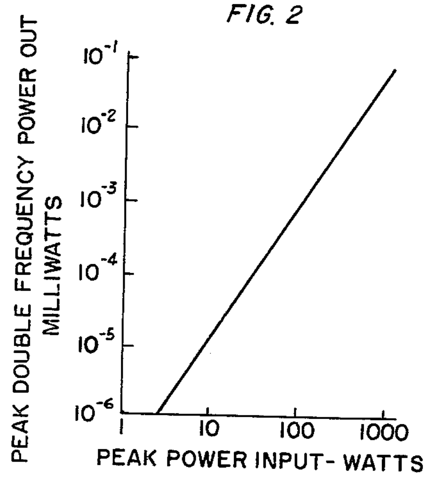

Over a range of input power levels, the peak output power of the device was found to be proportional to the square of the input power, as shown in FIG. 3.

Figure 4:
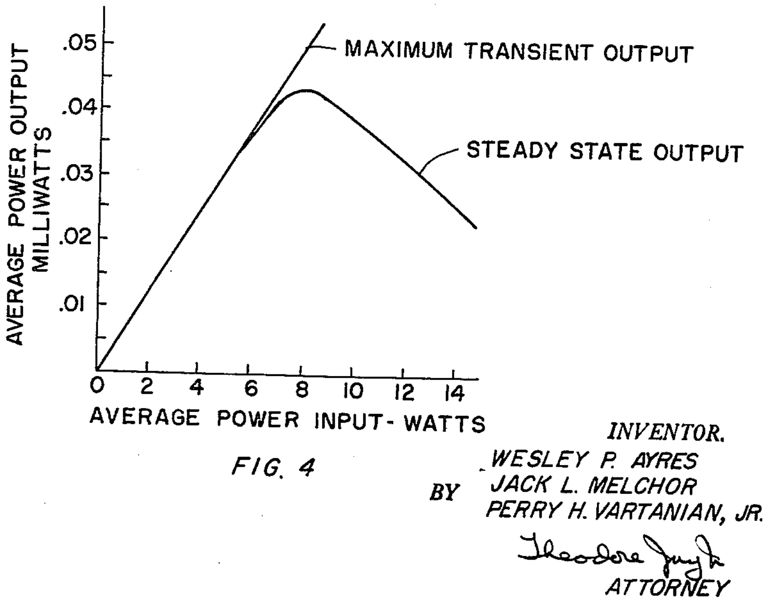

However, since ferrites are poor thermal conductors, if the average power level is to high, the temperature of the ferrite will increase and as it approaches the Curie point, the steady state power output will decrease as shown in FIG. 4. Artificial cooling means (not shown) can be used to cool the ferrite and thus permit operation at higher power levels.

Figure 5:
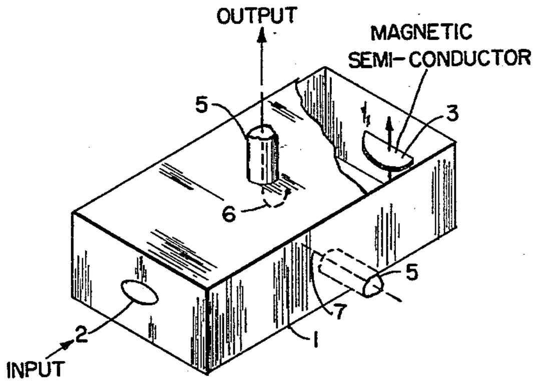
FIG. 5 shows a second embodiment.

The device of FIG. 5 is essentially the same as that of FIG. 1, except that coupling loop 4 of FIG. 1 is omitted and a coupling loop 6 is inserted into the broad wall of cavity 1 and terminated in a coaxial line 5. Alternatively, as shown by the dotted lines, a coupling probe 7 can be inserted in the narrow wall of the cavity and terminated in a coaxial line 5. In FIG. 5, the cavity is to be resonant at both input and output wave frequencies.

Figure 6:
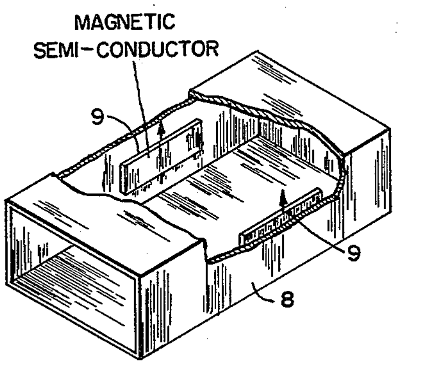
FIG. 6 shows a third embodiment.

The device of FIG. 6 shows a wave guide 8 having separate ferrite elements 9 along each narrow wall, the direction of the internal magnetic fields of element 9 being indicated on the drawing. When a first electromagnetic wave having its magnetic field component orthogonal to the internal field is propagated within the wave guide, the output wave with its magnetic field component oriented parallel to the internal field propagates down the wave guide.

Figure 7:
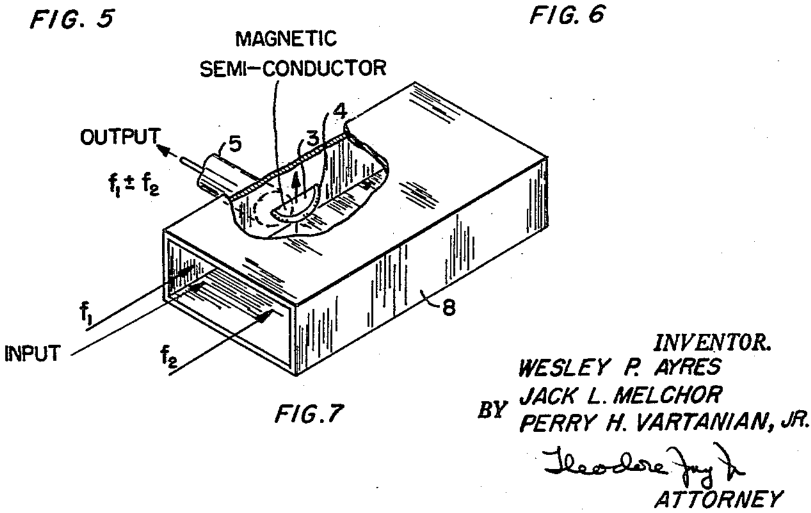
FIG. 7 shows a fourth embodiment.

FIG. 7 shows a device essentially like FIG. 6 and comprising a wave guide 8, a ferrite disc 3 on the wave wall, a coupling loop 4 coupled to the disc 3 and terminating in a coaxial line 5.

In all of the devices described above, when a first electromagnetic wave is supplied thereto, a second wave is produced in the manner indicated. Further, when first and second waves are supplied thereto, for example, the signals designated $f_1$ and $f_2$ in FIG. 7, propagating at various angles with respect to each other, the frequency mixing action will ensue as long as both first and second waves have different fixed frequencies and have their magnetic field components perpendicular to the internal magnetic field.

The interaction of these two waves in the semiconductor will produce a third wave having its magnetic field component directed parallel to the internal field. This third wave will contain the various frequency components normally produced during frequency mixing as, for example, the sum, difference (indicated at the output terminal 5 in FIG. 7) and products of the frequencies of the first and second waves.

Further, the same mixing action will ensue if only one incoming wave is used providing that this one wave is a complex wave containing two different frequency components.

As is well known to the art, when a magnetic semiconductor supports a time-invariant field, the electrons in the outer orbits of the atoms of the semiconductor are caused to precess at a frequency determined by the intensity of the internal field. This frequency is known as the gyromagnetic or ferromagnetic resonance frequency. When the frequency of an electromagnetic wave supplied to or induced in a semiconductor approaches this resonant frequency, the power losses in the semiconductor approach a maximum. Hence, if the frequency of the output wave yielded by the semiconductor of any of the devices shown in FIGS. 1, 5, 6 and 7 approaches the ferromagnetic resonant frequency, the power losses in the semiconductor rapidly increase.

Further, the efficiency of the frequency doubling or mixing operation as represented by the ratio of power output to power loss (exclusive of losses in the semiconductor itself) during frequency changing, which we define as the mixing or doubling parameter, is also a function of the internal field intensity. This parameter approaches a maximum value as the frequency of the output wave approaches the ferromagnetic resonant frequency.

Figure 2:
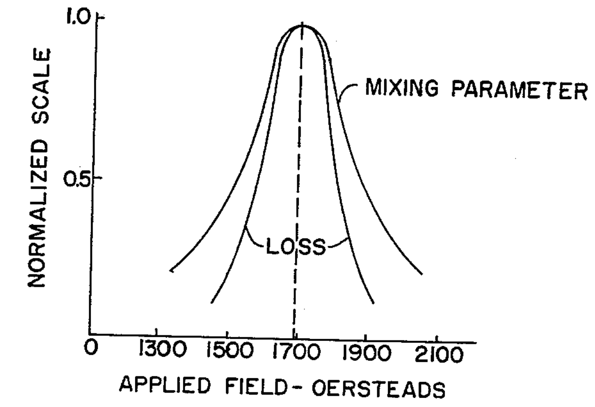
FIGS. 2, 3 and 4 illustrate graphically certain properties of the device shown in FIG. 1.

However, as shown in FIG. 2, the doubling or mixing parameter is a broader function of internal field intensity than the absorption losses due to ferromagnetic resonance. Hence, efficient operation can be obtained by adjusting the intensity of the internal field to a point at which the absorption losses are quite small, yet the mixing parameter still has a substantial value.

While we have shown and pointed out our invention as applied above, it will be apparent to those skilled in the art that many modifications can be made within the scope and sphere of our invention as defined in the claims which follow.

What is claimed is:

1. Microwave apparatus comprising, in combination, means for sustaining high frequency electromagnetic oscillations having its electric component oriented in a predetermined direction, a magnetic semiconductor element unidirectionally magnetized in a direction parallel to said predetermined direction and arranged within said means to be excited by said oscillations, said element when so magnetized and excited yielding electromagnetic oscillations at harmonics of said high frequency whose electric component is perpendicular to siad predetermined direction, and means coupled to said first-mentioned means and arranged preferentially to extract energy at said harmonic frequencies.

2. Microwave apparatus comprising, in combination, means for sustaining high frequency electromagnetic oscillations having its electric component oriented in a predetermined direction, a magnetic semiconductor element arranged within said means to be excited by said oscillations, means for producing a time-invariant magnetic field within said element in a direction parallel to said predetermined direction, said element when so magnetized and excited yielding electromagnetic oscillations at harmonics of said high frequency whose electric component is perpendicular to said predetermined direction, and means coupled to said first-mentioned means and arranged preferentially to extract energy at said harmonic frequencies.

3. Microwave apparatus comprising, in combination, a conductively bounded resonator adapted to sustain electromagnetic oscillations at a first frequency and at harmonics thereof, a magnetic semiconductor element arranged within said resonator to be excited by oscillations at said first frequency, means for producing a time-invariant magnetic field within said element in a direction parallel to the electric component of said electromagnetic oscillations at said first frequency, said element when so magnetized and excited yielding electromagnetic oscillations at harmonics of said first frequency the electric component of which is perpendicular to the direction of said magnetic field, and means coupled to said resonator and arranged preferentially to extract energy therefrom at said harmonic frequencies.

4. Microwave apparatus comprising, in combination, a conductively bounded resonator adapted to sustain electromagnetic oscillations at a fundamental frequency and at harmonics thereof, a magnetic semiconductor element disposed within said resonator, means for producing a time-invariant magnetic field within said element in a predetermined direction, means for coupling electromagnetic energy to said resonator at said fundamental frequency and whose electric component is oriented parallel to said predetermined direction, said element when so magnetized and excited yielding electromagnetic oscillations at harmonics of said fundamental frequency the electric component of which is perpendicular to said predetermined direction, and means coupled to said resonator arranged preferentially to extract energy therefrom at said harmonic frequencies.

5. Microwave mixing apparatus comprising in combination, a conductively bounded resonator adapted to sustain electromagnetic oscillations at differing microwave frequency, a magnetic semiconductor element positioned within said resonator, means for producing a time-invariant magnetic field within said element in a predetermined direction, means for coupling to said resonator first and second microwave signals of differing frequency and each having its electric component parallel to said predetermined direction, said element when thus magnetized and excited being operative to yield microwave signals having frequencies equal to the sum and difference of the frequencies of said first and second signals and having their electric component perpendicular to said predetermined direction, and means coupled to said resonator arranged preferentially to extract energy therefrom at said sum or difference frequencies.

6. Microwave apparatus comprising, in combination, a section of hollow wave guide having broad and narrow walls, means for coupling to said wave guide section electromagnetic energy having its electric component parallel to said narrow walls, a magnetic semiconductor element positioned with within said wave guide section, means for producing a time-invariant magnetic field in said element in a direction normal to said broad walls, said element when so excited and magnetized yielding electromagnetic energy at harmonic frequencies of the energy coupled to said wave guide section and having its electric component normal to said narrow walls, and means coupled to said wave guide section and arranged preferentially to extract therefrom energy at said harmonic frequencies.

7. Microwave apparatus comprising, in combination, a section of hollow wave guide having broad and narrow walls, means for coupling to said wave guide section electromagnetic energy having its electric component parallel to said narrow walls, a magnetic semiconductor element positioned within said wave guide section on a narrow wall thereof, means for producing a time-invariant magnetic field in said element in a direction normal to said broad walls, said element when so excited and magnetized yielding electromagnetic energy at harmonic frequencies of the energy coupled to said wave guide section and having its electric component normal to said narrow walls, and means coupled to said wave guide section and arranged preferentially to extract therefrom energy at said harmonic frequencies.

8. Microwave apparatus comprising, in combination, a section of hollow wave guide having broad and narrow walls, means for coupling to said wave guide section electromagnetic energy having its electric component parallel to said narrow walls, a magnetic semiconductor element positioned within said wave guide section on a narrow wall thereof, means for producing a time-invariant magnetic field in said element in a direction normal to said broad walls, said element when so excited and magnetized yielding electromagnetic energy at harmonic frequencies of the energy coupled to said wave guide section and having its electric component normal to said narrow walls, and a coaxial line connected to said wave guide section and arranged preferentially to extract therefrom energy at said harmonic frequencies.

9. Microwave apparatus comprising, in combination, a section of hollow wave guide having broad and narrow walls, a conductive wall closing one end of said wave guide section, means for coupling to the other end of said wave guide section electromagnetic energy having its electric component parallel to said narrow walls, a magnetic semiconductor element positioned within said wave guide section on a narrow wall thereof, means for producing a time-invariant magnetic field in said element in a direction normal to said broad walls, said element when so excited and magnetized yielding electromagnetic energy at harmonic frequencies of the energy coupled to said wave guide section and having its electric component normal to said narrow walls, and a coaxial line connected to said wave guide section and arranged preferentially to extract therefrom energy at said harmonic frequencies.

10. Apparatus in accordance with claim 9 wherein said semiconductor element comprises a semi-circular disc secured along its diameter to a narrow wall of said wave guide section.

11. Apparatus in accordance with claim 9 wherein said semiconductor element comprises a thin semi-circular disc secured along its diameter to a narrow wall of said wave guide section and disposed in a plane substantially parallel to and equidistant from said broad walls.

12. Apparatus in accordance with claim 11 wherein said coupling means comprises a coaxial line having inner and outer conductors, the inner conductor of said coaxial line encircling said semi-circular element and the outer conductor being connected to the wave guide wall to which said element is secured.

13. Apparatus in accordance with claim 11 wherein said semiconductor element is secured to said end wall and said coupling means comprises a coaxial line having inner and outer conductors, the inner conductor of said line extending into said wave guide section through a narrow wall thereof and forming a probe disposed parallel to said broad walls and the outer conductor of said line being connected to the corresponding narrow wall.

14. Apparatus in accordance with claim 11 wherein said ferrite element is secured to said end wall and said coupling means comprises a coaxial transmission line having inner and outer conductors, the inner conductor of said line extending into the said wave guide section through a broad wall and being formed to provide a coupling loop connected to said broad wall and the outer conductor being connected to the exterior of the corresponding broad wall.

15. In combination, a section of hollow rectangular wave guide having broad and narrow walls and adapted to sustain electromagnetic oscillations at a fundamental frequency and at harmonics thereof, a magnetic semiconductor element disposed within said wave guide section, means for producing a unidirectional magnetic field in said element in a direction normal to said broad walls, means for coupling to said wave guide section electromagnetic energy at said fundamental frequency and having its electric component normal to said broad wall, said element when thus excited and magnetized being operative to yield microwave signals at harmonics of said fundamental frequency, and means coupled to said wave guide section arranged preferentially to extract energy at said harmonic frequencies.

16. A microwave device comprising structure for supporting electromagnetic energy of two different frequencies in similar modes having parallel magnetic field components, an element of gyromagnetic material mounted in said structure and extended transverse to said magnetic field components whereby such components are concentrated in said material, means for establishing a static magnetic field through said material transverse to said magnetic field components at a value producing gyromagnetic resonance at the higher frequency of energy whereby energy is coupled by said material into modes at the sum and difference frequencies orthogonal to said similar modes, and means electromagnetically coupled to fields of said sum and difference frequencies with tuning means included for selecting a signal at one such frequency.

17. A microwave device comprising structure for supporting electromagnetic energy in two similar plane polarized modes having parallel magnetic field components and different frequencies, a gyromagnetic element mounted within said structure and having a longitudinal axis transverse to said magnetic field components, means for establishing a static magnetic field axially through said element at a value producing gyromagnetic resonance at the higher frequency of said energies whereby energy is translated to modes orthogonal to said similar modes, and means electromagnetically coupled to said orthogonal modes for deriving an output.

18. A microwave device comprising a section of rectangular waveguide for propagating energy in two similar plane polarizing modes having parallel magnetic field components at two different frequencies, a gyromagnetic element mounted within said waveguide with an axis transverse to the broad walls and to said magnetic field components, means for establishing a static magnetic field axially through said element at a value producing gyromagnetic resonance at the higher frequency of said energies whereby energy is translated to modes orthogonal to said similar modes, and means electromagnetically coupled to said orthogonal modes for deriving an output.

19. Microwave mixing apparatus comprising in combination, a structure adapted to sustain electromagnetic oscillations at differing microwave frequencies, a magnetic semiconductor element positioned within said structure, means for producing a time-invariant magnetic field within said element in a predetermined direction, means for coupling to said structure first and second microwave signals of differing frequencies and each having its electric component parallel to said predetermined direction, said element when thus magnetized and excited being operative to yield microwave signals having frequencies equal to the sum and difference of the frequencies of said first and second signals and having their electric component perpendicular to said predetermined direction, and means coupled to said structure arranged preferentially to extract energy therefrom at said sum or difference frequencies.

20. A microwave device comprising a structure for supporting electromagnetic energy of two different frequencies having parallel electric field components and parallel magnetic field components, an element of gyromagnetic material mounted in said structure whereby said components interact with said material, means for producing a time-invariant magnetic field within said element in a direction parallel to said electric field components, said material when thus magnetized and excited being operative to yield microwave signals having frequencies equal to the sum and difference of the frequencies of said two different frequencies and having their electric component perpendicular to said predetermined direction, and means coupled to said structure arranged preferentially to abstract energy therefrom at said sum or difference frequencies.

21. A microwave device comprising a section of rectangular waveguide for propagating energy having parallel electric field components at two different frequencies, a gyromagnetic element mounted within said waveguide, means for establishing a time-invariant magnetic field through said element parallel to the electric field components of said energy, said element when thus magnetized and excited being operative to yield output signals having frequencies equal to the sum and difference of said two different frequencies and having their electric component perpendicular to the electric components of the energy at said two different frequencies, and means coupled to said waveguide for preferentially extracting energy therefrom at said sum or difference frequencies.

22. A microwave device comprising structure for supporting electromagnetic energy in two similar plane polarized modes having parallel magnetic field components and different frequencies, a gyromagnetic element mounted within said structure and having an axis transverse to said magnetic field components, means for establishing a static magnetic field axially through said element at a value producing gyromagnetic resonance at the higher frequency of said energies whereby energy is translated to a mode orthogonal to said similar modes, and means electromagnetically coupled to said orthogonal mode for deriving an output.

References Cited in the file of this patent

UNITED STATES PATENTS

| | | |
|---|---|---|
| 2,748,352 | Miller | May 29, 1956 |
| 2,748,353 | Hogan | May 29, 1956 |
| 2,802,183 | Read | Aug. 6, 1957 |